United States Patent Office 3,663,457
Patented May 16, 1972

3,663,457
METHOD OF PREPARING AN OXIDIZING CATALYST FOR THE EXHAUST GASES OF INTERNAL COMBUSTION ENGINES
Takaaki Tamura, Tokyo, Tsutomu Kato, Hamamatsu-shi, and Kazuyoshi Sakamoto, Fukuroi-shi, Japan, assignors to Kachita Co., Ltd., Hamamatsu-shi, Japan
No Drawing. Filed June 8, 1970, Ser. No. 44,650
Claims priority, application Japan, June 12, 1969, 44/45,763
Int. Cl. B01j 11/06, 11/22
U.S. Cl. 252—463                             4 Claims

ABSTRACT OF THE DISCLOSURE

A method of preparing a granular oxidizing catalyst useful in the conversion of carbon monoxide contained in the exhaust gases of internal combustion engines to harmless carbon dioxide which comprises the steps of mixing fine powders of high purity manganese dioxide, copper oxide, activated alumina and alumina cement together, kneading the mixed powders with water into a paste, forming the paste into wet granules of suitable size, allowing the still wet granules to stand as they are over 24 hours to increase the hardness thereof and thermally drying them for natural solidification into a rigid form.

---

This invention relates to a method of preparing a granular catalyst useful in the conversion of carbon monoxide contained in the exhaust gases of internal combustion engines, particularly of automobile engines, to harmless carbon dioxide.

In recent years, with the enormous increase in the number of automobiles, air pollution caused by carbon monoxide contained in automobile exhaust gases, has become a serious problem. Automobile exhaust gases contain relatively large amounts of carbon monoxide, that is, about 4% by volume on average. People who inhale air containing CO at a concentration of more than 20 p.p.m. tend to have an impaired blood circulating system accompanied by toxicosis which causes headaches, giddiness and nausea. Such conditions may, in the worst cases, cause death.

While many researches have been effected with a view to removing CO gas from exhaust gases, no really effective absorbent of the gas or oxidizing catalyst suitable for the conversion of CO into harmless $CO_2$ has been developed. Devices have been manufactured for trial wherein the exhaust gas is passed through an after-burner which functions by burning out the CO remained in the exhaust gas. However, such after-burner cannot be used widely because of their complicated construction, high cost of fabrication and inconvenience in handling.

We have developed two kinds of oxidizing catalyst suitable for removing carbon monoxide from the exhaust gas by converting it to carbon dioxide, as described in detail in the specifications of U.S. Pats. 3,436,356 and 3,498,928.

One of these catalyst essentially comprises a granular product molded at a great pressure of about 6,000 kg./cm.$^2$, having a granule size of about 5 mm. and consisting of a fine powder of natural zeolite ore activated by dilute hydrochloric acid uniformly blended with almost equal quantities of a fine powder mixture consisting of from 6 to 7 parts by weight of manganese dioxide and from 4 to 3 parts by weight of copper oxide.

The other catalyst essentially comprises a granular product molded at a relatively low pressure of about 500 kg./cm.$^2$ and having a similar granule size and composition to the above-mentioned type, excepting that some amounts of aluminic ester solution in an organic solvent are to be absorbed into the granular product. The ester is subjected to natural hydrolysis to vaporize off or burn out the volatile matter contained in the product by the heat of hydrolization. Accordingly, the particles of the catalyst can be rigidly hardened by the binding network structure of aluminium oxide formed therein.

The activity and life of these catalysts were tested by placing them in a CO elimination box disposed behind the exhaust silencer, or commonly called muffler, of an automobile. After a bench test corresponding to a run of 20,000 km., the CO content in the exhaust gases discharged from the box was less than 0.7% for both types of catalyst. The run of most automobiles is estimated to average about 20,000 km. per year, which means that each of these catalysts has a working life of about one year after which they should be replaced. The current aim of the authorities is to have the CO content of exhaust gases reduced to below 1.5%. Accordingly, use of the aforesaid catalyst is expected to attain said aim.

The aforementioned running test was not conducted by causing a commercial automobile equipped with the catalyst actually to run on the ground surface, but simply by rotating the wheels of a test body on rollers set in an automobile plant without moving said body. Later, however, when a commercial automobile provided with the catalyst was put to an actual running test by allowing it to travel in the open air, it was found that heavy shaking caused by the run of the automobile on the road gradually damaged the catalyst granules, and after an actual run of 10,000 km., causing the major portion of the catalyst granules to crumble away with the resultant noticeable decrease in the oxidizing function of the catalyst.

The objection of the present invention is to provide an oxidizing catalyst which is not likely to crumble away even after an automobile equipped with said catalyst makes a run of more than 20,000 km. in the open air and moreover is capable of maintaining the CO content of exhaust gases from the muffler at 0.7 percent max. throughout said run.

This object has been attained by blending 10 parts by weight of a mixture consisting of 6 to 7 parts by weight of fine powders of high purity manganese dioxide and 4 to 3 parts by weight of fine powders of high purity copper oxide with a mixture consisting of 5 to 10 parts by weight of activated alumina and 8 to 10 parts by weight of high purity alumina cement, kneading the blend with water into a paste, forming the paste into granules, allowing said granules to stand as they are over 24 hours and thermally drying them for natural solidification into a rigid form.

We have conducted studies on the cause which lead to the aforementioned insufficient durability of the granular catalysts obtained by the previously described two inventions. As a result, it has been disclosed that there was not employed a strong binder in granulation and one of the main components of the catalyst consisted of natural zeolite whose mechanical strength was reduced through absorption of moisture. The reason why the binder was not used originated with the expected possibility of the catalyst surface being reduced in activity when covered with such binder. Further, the natural zeolite acted as a diluent as well as a desiccant for the other main components of manganese dioxide and copper oxide.

It has been found, however, that while the natural zeolite repeatedly adsorbed and desorbed moisture generated by combustion of fuel, the volume of its granules was also repeatedly expanded and contracted, so that the granules gradually decreased in mechanical strength until they crumbled away. Accordingly, although it was desired to use manganese dioxide and copper oxide as parts of the main composition of the subject catalyst as in the previous case, further studies were conducted under the plan to give up the use of natural zeolite as both diluent and desiccant, search for a substitute therefor, find a new material which would act as a strong binder and yet not exert an adverse effect on catalyst activity, and discard, if possible, such a granulation process as would involve strong pressure which caused much trouble in operation.

As a result, there has been obtained a novel oxidizing granular catalyst using activated alumina as a material concurrently acting as a diluent and desiccant, high purity alumina cement as a binder, blending suitable proportion of high purity manganese dioxide and copper oxide used as main constituents with a mixture of the first mentioned materials, kneading the blend with water into a paste, forming the paste into granules, allowing the granules to stand as they are over 24 hours, and thermally drying them for natural solidification into a rigid form.

The activated alumina is an amorphous substance and well adsorbs moisture and hydrocarbon gases present in the atmosphere at room temperature and desorbs the adsorbed substances at a temperature of from 180° to 320° C. The activated alumina has a function resembling that of natural zeolite, but is characterized in that unlike natural zeolite, it does not present any volumetric change in adsorption and desorption and, what is better, fully withstands temperatures of more than 1,500° C., serving to impart head resistance to the oxidizing catalyst in which it is incorporated.

A mixture of powdered high purity manganese dioxide and copper oxide indeed displays full catalytic activity in the CO conversion at temperatures of from 0 to 60° C. When, however, temperature rises above 60° C., the mixture will suddenly lose its catalytic activity. In contrast, a catalyst prepared by adding activated alumina to the mixture exhibits full activity even at as high a temperature as 800° C., to say nothing of room temperature. The activated alumina used in the present invention may be prepared by comminuting a commercially available high purity grade into fine powders.

Alumina cement used as a binder is a quick-hardening type consisting of $CaO \cdot Al_2O_3$, $5CaO \cdot 3Al_2O_3$, $$3CaO \cdot 5Al_2O_3$$

or mixtures thereof. When hydrated overnight, the alumina cement generally presents a practically useful compressive strength and also sufficient heat resistance for use as refractories. Generally available alumina cement for use in quick-hardening concrete or refractories contains appreciable amounts of impurities such as $SiO_2$ and $Fe_2O_3$ derived from lime stone, bauxite or aluminous shale constituting its main raw materials. However, the alumina cement used as a binder in the catalyst of the present invention should be prepared from raw materials of fully high purity substantially free from the aforementioned impurities. Otherwise, the resultant catalyst would present little activity.

A paste prepared by kneading with water, activated alumina and alumina cement blended with a mixture of suitable amounts of powdered manganese dioxide and copper oxide both of high purity can be granulated in quantity by an ordinary rotary pan or drum type pelletizer easily and efficiently without applying any pressure. When allowed to stand about overnight after granulation, the granules will harden due to hydration, and when further dried at temperatures of from 150° to 300° C., will become a firmly solidified catalyst.

One of the outstanding features of the present invention is that an activated alumina used as a combination diluent and desiccant and an alumina cement acting as a binder do not degrade at all the activity of the granular catalyst. Another characteristic of the method of the present invention is that it considerably facilitates manufacture of such granular catalyst. As later described in the example, when an automobile provided at its exhaust port with a catalyst obtained by the method of the invention was tested by an actual travel in the open air, it was proved that the catalyst granules were little damaged even after a run of 20,000 km., and the CO conversion rate at the end of said run did not fall from 70 percent.

According to the method of the present invention, the catalyst preferably consists of 10 parts by weight of a mixture of powders of substantially pure manganese dioxide and copper oxide (the blended ratio being 6 to 7 parts by weight of manganese dioxide with respect to 4 to 3 parts by weight of copper oxide), 5 to 10 parts by weight of substantially pure activated alumina and 8 to 10 parts by weight of substantially pure alumina cement.

It will be apparent that the catalyst of the present invention is not limited to use in the purification of exhaust gases from automobiles, but applicable in removing carbon monoxide contained in the exhaust gases of other engines operated by petroleum-base fuels.

EXAMPLE

The present invention will be more clearly understood from the example which follows. Among the catalyst components, there were first prepared substantially pure manganese dioxide and copper oxide.

While there were already described a process of manufacturing them in the specifications of the aforesaid prior inventions, it is set forth here again.

A fine powder of manganese dioxide, one of the principal components of the catalyst, was prepared by the following procedure: 500 g. of commercial manganese sulfate $MnSO_4 \cdot 4H_2O$ was dissolved in 800 cc. of water whilst heating to 40° C. (This temperature offers a maximum solubility of the salt in water.) The solution was allowed to cool and a saturated solution with a small amount of precipitation of the salt was obtained. 1,200 g. of 98 percent sulfuric acid were added to 1,000 g. of the saturated solution whilst the temperature of the solution was kept at about 55° C., whereupon an extremely finely-divided precipitate of white anhydrous manganese sulfate settled.

210 g. of powdered potassium permanganate was added to the saturated solution containing the precipitated anhydrous manganese sulfate whilst the solution was stirred at a temperature of from 50 to 60° C. The following reaction (1) took place:

$$5MnSO_4 + 4KMnO_4 + 3H_2O = 9MnO_2 + 2K_2SO_4 + 3H_2SO_4 + \tfrac{1}{2}O_2 \quad (1)$$

As will be seen from Equation 1, manganese dioxide is obtained from the solution; oxygen gas is generated as well. The solution was cooled by stirring for a short time after the potassium permanganate had been added and the precipitate was then water-washed by decantation until the washing liquor became neutral. The precipitate was then filtered from the liquor and completely dried. The manganese dioxide was obtained as an extremely pure and fine powder.

Powdered copper oxide for use in the catalyst was prepared as follows: 400 g. of commercial copper sulfate $CuSO_4 \cdot 5H_2O$ was dissolved in 2,000 cc. of water whilst heating to 50° C. 1,400 cc. of 10 percent aqueous sodium hydroxide solution was added to the copper sulfate solution and the temperature of the mixed solution was kept at about 50° C. A finely-divided precipitate of blue-black copper hydroxide was deposited, the pH at precipitation being about 8.

The solution containing the precipitated copper hydroxide was cooled and the precipitate was then water-washed by decantation until the washing liquor became neutral. The precipitate was then filtered from the liquor. After drying and calcination, the copper oxide was obtained as an extremely pure and fine powder.

In this example the main component of the present catalyst consisted of a mixture of 7 parts by weight of manganese dioxide and 3 parts by weight of copper oxide which were prepared in the aforesaid manner. To 10 parts by weight of said mixture were uniformly added 10 parts by weight of commercially available alumina pulverized into fine powder and 10 parts by weight of high purity alumina cement to form the raw materials of the catalyst. The alumina cement used was prepared by comminuting clinkers obtained by melting in an electric furnace an equimolecular mixture of powders of alumina produced by the Bayer process and precipitated calcium carbonate.

The aforementioned mixed mass was kneaded with water into a paste, which was then granulated into pellets 3 to 5 mm. in particle size by a rotary pan type pelletizer. When allowed to stand overnight, the wet granules hardened with a sufficient mechanical strength to be prevented from crumbling even when there was placed a 5 kg. weight on each particle of them. The granules were further dried 3 hours at a temperature of 250° C., obtaining so rigidly solidified catalyst granules that placement of even a 10 kg. weight on each of the particle did not cause it to crumble, either.

A reaction vessel positioned after the exhaust muffler of a motor vehicle equipped with a 1,500 cc. gasoline engine of four-cylinder type was filled with 10 liters of the aforesaid catalyst granules. The reaction vessel was further provided with a device for introducing air thereinto in amounts equal to one-third of the exhaust gas released from said engine. Introduction of air was intended to serve the double purpose of oxidizing the carbon monoxide contained in the exhaust gas and preventing the excess temperature rise of the catalyst. An engine fitted with a decontamination vessel involving the present catalyst was put to a practical test by allowing a vehicle equipped with said engine to travel in the open air with occasional rests.

Since the catalyst had a certain degree of activity even at room temperature, it reduced the CO content of the exhaust gas to less than 0.01 percent at the temperature of about 50° C. to which it was subjected right after the vehicle started running, the CO conversion rate approaching 100 percent. When the catalyst temperature rose to 200° to 800° C. as the result of the further running of the vehicle, the CO conversion rate substantially reached 100 percent, said rate still remaining unchanged up to the end of the initial 10,000 km. run. After a 15,000 km. run, the CO content of the exhaust gas amounted to 0.3 percent, or the conversion rate stood at about 80 percent. Even after a 20,000 km. run, the catalytic activity decreased only slightly, namely the CO content of the exhaust gas dropped just a little to 0.4 percent, or the conversion rate indicated about 75 percent. After the 20,000 km. run, the catalyst was taken out to be checked. Then it was noticed that the catalyst granules had not substantially crumbled and their compressive strength had not fallen to below 5 kg. on average.

What we claim is:

1. A method of preparing an oxidizing catalyst for the exhaust gases of internal combustion engines which comprises mixing powdered manganese dioxide, copper oxide, activated alumina and alumina cement together in the proportions of 10 parts by weight of a mixture consisting of 6 to 7 parts by weight of manganese dioxide and 4 to 3 parts by weight of copper oxide, blended with 5 to 10 parts by weight of activated alumina and 8 to 10 parts by weight of alumina cement, kneading the mixed powders with water into a paste, granulating the still wet paste, allowing the granules to stand as they are over 24 hours to increase the hardness thereof and thermally drying the hardened granules for natural solidification into a rigid form.

2. A method according to claim 1 in which the powdered manganese dioxide, copper oxide, activated alumina and alumina cement are substantially of pure quality.

3. A method according to claim 1 in which the temperature used in drying and solidifying the granules is from 150° to 300° C.

4. A granular oxidizing catalyst prepared by the method of claim 1.

References Cited
UNITED STATES PATENTS

| | | | |
|---|---|---|---|
| 3,554,929 | 1/1971 | Aarons | 252—463 X |
| 3,558,508 | 1/1971 | Keith et al. | 252—463 X |

DANIEL E. WYMAN, Primary Examiner

W. J. SHINE, Assistant Examiner

U.S. Cl. X.R.

252—471, 476; 23—2 E